United States Patent [19]

Daxelmueller et al.

[11] Patent Number: 5,015,539

[45] Date of Patent: May 14, 1991

[54] BIMETALLIC STRIP FOR METAL SAWS

[75] Inventors: Manfred Daxelmueller, Maidhofen/Ybbs; Dieter Doeberl, Boehlerwerk/Ybbs; Gerhard Kraxner, Boehlerwerk, all of Austria

[73] Assignee: Bohler Ges. M.b.H., Kapfenberg, Austria

[21] Appl. No.: 280,114

[22] Filed: Dec. 5, 1988

[30] Foreign Application Priority Data

Dec. 4, 1987 [AT] Austria ............... 3196/87

[51] Int. Cl.⁵ ............................. B32B 15/00
[52] U.S. Cl. .................... 428/685; 428/683
[58] Field of Search ........ 428/683, 685, 685; 420/95, 119; 148/336

[56] References Cited

U.S. PATENT DOCUMENTS

| | | | |
|---|---|---|---|
| 3,719,790 | 3/1973 | Plöckinger et al. | 428/683 |
| 3,930,426 | 1/1976 | Berggren et al. | 428/683 |
| 4,041,274 | 8/1977 | Sadowski | 420/34 |
| 4,058,650 | 11/1977 | Kiyonaga et al. | 428/683 |

FOREIGN PATENT DOCUMENTS

| | | |
|---|---|---|
| 371149 | 10/1981 | Austria . |
| 0256619 | 2/1988 | European Pat. Off. . |
| 5635750 | 8/1979 | Japan . |
| 60-255959 | 5/1984 | Japan . |
| 619903 | 6/1984 | Japan . |

*Primary Examiner*—Deborah Yee
*Attorney, Agent, or Firm*—Fleit, Jacobson, Cohn, Price, Holman & Stern

[57] ABSTRACT

A bimetallic strip or band for manufacturing metal saw blades and metal band saw bands includes a support strip and a tool steel top layer. The top layer is high speed tool steel. The support strip is martensitically hardenable maraging steel having a maximum carbon concentration of 0.05 wt. % and a content of alloying elements of at least 10 wt. %.

8 Claims, No Drawings

BIMETALLIC STRIP FOR METAL SAWS

FIELD OF THE INVENTION

The invention relates to a bimetallic strip or band. Particularly, the invention relates to a bimetallic strip or band for manufacturing metal saw blades and metal band saw bands, which strip is comprised of a support strip and a tool steel top layer wherewith the top layer is preferably comprised of high speed tool steel.

DESCRIPTION OF THE BACKGROUND ART

Bimetallic strips for metal saw blades and metal band saw bands are manufactured by welding a tool steel top layer, preferably comprised of high speed tool steel, onto a support strip, e.g., by means of electron beam welding. Typically, this is followed by tempering the zone hardened in the welding by means of tempering heat treatment of the raw strip and by subsequent soft-annealing heat treatment of the raw strip in the weld seam region. The softened strip is then sent to fabrication operations such as final machining, etc.

After the sawteeth are machined and, possibly, set, the metal saw blade or metal band saw band is hardened and tempered. The hardening and tempering temperatures must be set appropriately for the tool steel or high speed tool steel alloy. Accordingly, the hardening temperature used for the bimetallic product is unusually high for the steel of the support strip and, therefore, excessively large grains can form and the material can be embrittled.

In order to withstand the high operational stresses which occur, and to do so with a long service life and with good cutting properties of the saw, the final hardness of the high speed tool steel teeth must be at least 65 HRC. The hardness of the support strip must be at least 470 HV in order to avoid undesirable edge deflection and to provide good guiding stability. For band saws, it is crucially important that the support strip have high bending fatigue strength and good toughness.

It is known that the use of carbon steels and preferably spring steels with carbon contents of 0.2-0.6% and contents of alloying elements of up to 10% is desirable for these uses. Such materials can be welded to high speed tool steel by the use of suitable methods which minimize the tendency to form:
brittle regions, or
regions of inferior hardness
in the weld zone. Such brittle or soft regions can form during welding and/or during heat treatment. They result from diffusion of elements, particularly carbon, due to different concentrations or activities of the diffusing elements in the alloys of different composition.

Austrian Pat. 371,149 discloses the microalloying elements can be added to the support strip material, to avoid excessively large grain formation in the hardening process. The hardening process is directed at the high speed tool steel material and, thereby, prevents degradation of the toughness parameters.

All bimetallic saw strips for cutting metal thus have the disadvantage that, when one attempts to employ suitable hardening and tempering processes to produce good cutting properties in the top layers comprised of tool steel or high speed tool steel, it is difficult to simultaneously obtain good properties of the support strip. In particular, the bending fatigue strength of the support strip is limited. Consequently, fractures of the saw strip can occur, as a result of fatigue of the material of the support strip, even though the basic cutting properties remain satisfactory. Higher quality cutting materials can be employed such as in the cutting layers which have better cutting properties, but their use is uneconomical. This is because the service life of the support strip is much less than the service life of the sawteeth.

SUMMARY OF THE INVENTION

The underlying problem or object of the invention is to devise a bimetallic strip for a saw blade or band which provides improved long-term operational properties and longer service life of the saw. The support strip has high bending fatigue strength, hardness, and toughness, and the transition zone between the support strip and the tool steel top layer has suitable mechanical parameters (i.e., the weld zone has suitable mechanical parameters).

DETAILED DESCRIPTION OF THE INVENTION

This problem is solved according to the invention in that the support strip is comprised of a martensitically hardenable maraging steel with maximum carbon concentration of 0.05 wt.% and a content of alloying elements of at least 10 wt.%, preferably at least 18 wt.%. Preferably the support strip has carbon content 0.007-0.03 wt.%, particularly preferably 0.01-0.02 wt.%, and contains alloying elements as follows ("p.p."="particularly preferably"):

Ni -25 wt.%, p.p. 8-18 wt.%
Co 4-15 wt.%, p.p. 6-12 wt.%
Mo 2-10 wt.%, p.p. 4-8 wt.%
Ti and/or Al and/or Nb/Ta 0.2-2 wt.%, p.p. 0.4-1 wt.%
Fe and [trace]
impurities
from the melt (remainder).

This composition yields high bending fatigue strength, hardness, and toughness of the support strip and the required mechanical parameters of the weld are all achieved.

For martensitically hardenable maraging steel the carbon content of the alloy should be as low as possible. Otherwise carbides (e.g., TiC, MoC, $Mo_2C$, NbC, etc.) are formed with the elements which have affinity for carbon. These carbides occur in a soft matrix, particularly at the grain boundaries. They lead to embrittlement of the material. Further, in the event high solution heat treatment temperatures are used (>900° C. to 1000° C.), there is substantial grain growth. The grain growth is accompanied with formation of large grains which have a major detrimental effect on the mechanical properties, particularly the toughness and bending fatigue strength.

One skilled in the art is aware that the low carbon content of martensitically hardenable alloys (maraging steel) enables joining of parts of similar types, e.g., by TIG (tungsten inert gas shielded) welding, particularly by electron beam welding. If appropriate favorable welding parameters are employed, and if the welding is followed by solution heat treatment, cooling, and aging of the material, with the same hardness as in the base material the deformation at fracture are lower and the survival probability for vibrational or oscillatory stresses in the weld zone are lower. Nonetheless, the product can be used under mild conditions as regards bending fatigue.

Steels with a content of alloying elements greater than 10 wt.% have different thermal conductivities and different thermal coefficients of expansion than low alloy materials used for steel blades or bands for saws. In practice with these steels (e.g., under the heat generation occurring during sawing), the support strip can suffer warping and severe bowing deformation, leading to rough and uneven saw cuts.

It turns out, surprisingly, that a top layer of tool steel or high speed tool steel applied on a support strip comprised of martensitically hardenable maraging steel with a maximum of 0.05 wt.% carbon and at least 10 wt.% of alloying elements can be affixed by welding, and that a saw blade (or particularly a band saw band) produced therefrom can have a much improved sawing service life. One skilled in the art would expect that in the region of the weld zone (e.g., between the high speed tool steel and support strip), carbide deposits would be formed in a soft, brittle matrix. This is because the high temperatures of welding, hardening, and tempering would cause alloying elements, particularly carbon, to diffuse toward locations of lower concentration. One skilled in the art would also have the opinion that with a hardening process adapted to tool steel or high speed tool steel, requiring austinitization temperatures of c. 1150–1220° C., a martensitically hardenable alloy (maraging steel) would be embrittled by formation of large grains due to the fact that its solution heat treatment temperature is exceeded by as much as 500° C. The extent of this embrittlement is such that it would be impossible to achieve a satisfactory bending fatigue strength in the support strip. However, in the experiments that resulted in this invention, this prejudice in the art was not found to be true. The hardness and toughness of the weld zone, under conditions of intermittent stressing of the sawteeth, and the bending fatigue strength and hardness of the support strip in the case of a running band saw, were such that in practice much greater service life of the saws (i.e., saw blades or bands) was achieved. In addition, it was found that a carbon content of 0.01–0.02 wt.% in the martensitically hardenable alloy (maraging steel) reduces grain growth in the case of heat treatment at temperatures above the solution heat treatment temperature. This results in improved mechanical properties, particularly fracture toughness and bending fatigue strength.

In practical sawing, it is surprising that the expected warping and bowing of the saw blade, which is attributable to differences in thermal conductivity and thermal coefficient of expansion in materials with contents of alloying elements of over 10 wt.%, were not observed. Particularly good properties were obtained in metal saws if the support strip had the following composition:
Ni 8–18 wt.%
Co 6–12 wt.%
Mo 4–8 wt.%
Ti 0.4–1 wt.%
Fe and [trace] impurities from the melt (remainder).

The examples below describe the inventive bimetallic strip or band in more detail with reference to concrete examples of manufacturing and testing.

EXAMPLE 1

A bimetallic band with dimensions 1.27×38.1 mm was produced as follows. A support strip having the composition indicated in Table 1 and having been solution heat treated at 800° C. was subjected to electron beam welding to affix a cutting layer or top layer comprised of a high speed tool steel, (DIN Werkstaff No.) Material No. 1.3343 (AISI M2).

TABLE 1

| | \multicolumn{11}{c}{(Figures in Weight Percent):} | | | | | | | | | | |
|---|---|---|---|---|---|---|---|---|---|---|---|
| | C | Si | Mn | Cr | Mo | Ni | V | W | Co | Ti | Al |
| A | 0,009 | 0,07 | 0,085 | 0,14 | 5,06 | 18,17 | 0,016 | 0,20 | 8,55 | 0,53 | 0,083 |
| B | 0,85 | 0,30 | 0,30 | 4,00 | 5,10 | 0,10 | 1,95 | 6,10 | 0,05 | — | 0,015 |

KEY to Table 1: (A) Support Strip; (B) Tool Steel.

After the welding, the zone influenced by the weld was annealed or tempered at c. 400° C., followed by soft annealing at 730° C. for 9 hours, after which the soft strip was subjected to a fabrication operation comprising rolling and grinding, to produce the desired dimensions. Then sawteeth were machined into the soft strip. Thereafter, hardening and tempering adapted to the tool steel were carried out as per Table 2.

TABLE 2

| | Temperature | Time | Cooling Medium |
|---|---|---|---|
| Hardening | 1210° C. | 30 seconds | Oil |
| 1st Tempering | 560° C. | 1 hour | Air |
| 2nd Tempering | 560° C. | 1 hour | Air |

In a test of the material, it was determined that the support strip had hardness 560 to 570 HV, and the high speed tool steel had final hardness 860–870 HV (i.e., 65 HRC). The hardness of the material in the weld seam region increased continuously from 560–570 HV to 860–870 HV. Metallographic examinations of the weld zone in the saw band revealed a transition from a precipitation-hardened martensitic grain structure to a hardened and tempered grain structure of the high speed tool steel. No carbide and/or austenitic concentrations were present. The support strip and weld region had high toughness parameters. The bending fatigue strength test, with a deflection stress of amplitude sigma a+1030 N/sq mm, gave 45,000 load cycles to failure. In practice a metal saw lasted 1.8 times longer than this.

EXAMPLE 2

A bimetallic band with dimensions 1.60×67.0 mm and a combination of materials defined by the chemical composition given in Table 3 was fabricated by electron beam welding. The initial material for the tool steel (high speed tool steel) layer was manufactured by a powder metallurgical technique.

TABLE 3

| | C | Si | Mn | Cr | Mo | Ni | V | W | Co | Ti | Al |
|---|---|---|---|---|---|---|---|---|---|---|---|
| | \multicolumn{11}{c}{(Figures in Weight Percent):} | | | | | | | | | | |
| A | 0,012 | 0,04 | 0,06 | 0,12 | 4,23 | 18,10 | — | 0,08 | 12,07 | 1,54 | 0,13 |
| B | 1,52 | 0,34 | 0,32 | 4,01 | 5,90 | 0,03 | 4,23 | 7,93 | 8,06 | — | 0,003 |

KEY to Table 3: (A) Support Strip; and (B) Tool Steel.

The band was further processed by fabrication as in Example 1 to produce a bimetallic band saw band. The hardening and tempering parameters summarized in Table 4 were used.

TABLE 4

| | Temperature | Time | Cooling Medium |
|---|---|---|---|
| Hardening | 1120° C. | 55 seconds | Oil |
| 1st Tempering | 560° C. | 1.2 hours | Air |
| 2nd Tempering | 560° C. | 1 hour | Air |

After the heat treatment, the support strip had hardness 580-590 HV, and the high speed tool steel layer had hardness 940-950 HV. The hardness curve in the junction region between the two materials (i.e., in the weld zone) was again continuous and had good toughness. Metallographic studies revealed that the carbides formed in the support material due to the carbon content of 0.012 wt.% resided in the interior of the grains and not at the grain boundaries. These studies also revealed that, despite the hardening temperature of 1220° C. employed, which was c. 420° C. above the solution heat treating temperature of the precipitation-hardened alloy (maraging steel), a fine grain structure was produced with values higher than ASTM 5. The bending fatigue strength test, with a deflection stress of amplitude sigma a+1030 N/sq mm, gave 71,000 load cycles to failure. In practice in a band saw, service life was about 3 times that for bimetallic saw bands using spring steel for the support strip. Further, the attainable cutting rate was substantially higher because of the use of a tool steel produced by powder metallurgy.

We claim:

1. A welded bimetallic strip or band, which can be used for manufacturing metal saw blades and metal saw bands, comprising a top layer of high speed tool steel and a support strip, wherein said top layer is metallurgically welded along at least one surface to at least one surface of said support strip, said support strip comprising a martensitically hardenable maraging steel containing a maximum carbon content of 0.05 wt.% and alloying elements of at least 10 wt.% in relative amounts as follows:
   (i) Ni in an amount of 4-25 wt.%;
   (ii) Co in an amount of 4-25 wt.%;
   (iii) Mo in an amount of 2-10 wt.%;
   (iv) a member of the group consisting of Ti, Al, Nb, Ta, and mixtures thereof in a total amount of 0.2-2 wt.%; and
   (v) Fe and trace impurities from the melt (remainder).

2. The bimetallic strip or bank as claimed in claim 1 wherein said carbon content comprises 0.007-0.03 wt.%.

3. The bimetallic strip or band as claimed in claim 2 wherein said alloying elements comprises at least 18 wt.%.

4. The bimetallic strip or band as claimed in claim 1 wherein:
said carbon content comprises 0.01-0.02 wt.%; and
said alloying elements comprise at least 18 wt.%.

5. The bimetallic strip or band of claim 1 wherein said martensitically hardenable maraging steel of said support strip contains alloying elements as follows:
   (i) Ni in an amount of 8-18 wt.%;
   (ii) Co in an amount of 6-12 wt.%;
   (iii) Mo in an amount of 4-8 wt.%;
   (iv) a member of the group consisting of Ti, Al, Nb, Ta, and mixtures thereof in a total amount of 0.4-1 wt.%; and
   (v) Fe and trace impurities from the melt (remainder).

6. The bimetallic strip or band of claim 2 wherein said martensitically hardenable maraging steel of said support strip contains alloying elements as follows:
   (i) Ni in an amount of 8-18 wt.%;
   (ii) Co in an amount of 6-12 wt.%;
   (iii) Mo in an amount of 4-8 wt.%;
   (iv) a member of the group consisting of Ti, Al, Nb, Ta, and mixtures thereof in a total amount of 0.4-1 wt.%; and
   (v) Fe and trace impurities from the melt (remainder).

7. The bimetallic strip or band of claim 3 wherein said martensitically hardenable maraging steel of said support strip contains alloying elements as follows:
   (i) Ni in an amount of 8-18 wt.%;
   (ii) Co in an amount of 6-12 wt.%;
   (iii) Mo in an amount of 4-8 wt.%;
   (iv) a member of the group consisting of Ti, Al, Nb, Ta, and mixtures thereof in a total amount of 0.4-1 wt.%; and
   (v) Fe and trace impurities from the melt (remainder).

8. The bimetallic strip or band as claimed in claim 6 wherein:
said carbon content comprises 0.01-0.02 wt.%; and
said alloying elements comprise at least 18 wt.%.

* * * * *